(12) United States Patent
Weng

(10) Patent No.: US 7,711,663 B2
(45) Date of Patent: May 4, 2010

(54) MULTI-LAYER DEVELOPMENT NETWORK HAVING IN-PLACE LEARNING

(75) Inventor: Juyang Weng, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 577 days.

(21) Appl. No.: 11/728,711

(22) Filed: Mar. 27, 2007

(65) Prior Publication Data

US 2008/0005048 A1    Jan. 3, 2008

Related U.S. Application Data

(60) Provisional application No. 60/786,257, filed on Mar. 27, 2006.

(51) Int. Cl.
*G06F 15/18* (2006.01)
(52) U.S. Cl. .................................... 706/14
(58) Field of Classification Search ............ 706/14
See application file for complete search history.

(56) References Cited

U.S. PATENT DOCUMENTS

| | | | |
|---|---|---|---|
| 6,081,273 A * | 6/2000 | Weng et al. ............. | 345/420 |
| 6,169,981 B1 * | 1/2001 | Werbos .................. | 706/23 |
| 6,353,814 B1 * | 3/2002 | Weng .................... | 706/12 |
| 6,581,048 B1 * | 6/2003 | Werbos .................. | 706/23 |
| 6,904,335 B2 * | 6/2005 | Solomon ................ | 700/247 |
| 7,343,222 B2 * | 3/2008 | Solomon ................ | 700/245 |

* cited by examiner

*Primary Examiner*—Michael B Holmes
(74) *Attorney, Agent, or Firm*—Harness, Dickey & Pierce, P.L.C.

(57) ABSTRACT

An in-place learning algorithm is provided for a multi-layer developmental network. The algorithm includes: defining a sample space as a plurality of cells fully connected to a common input; dividing the sample space into mutually non-overlapping regions, where each region is a represented by a neuron having a single feature vector; and estimating a feature vector of a given neuron by an amnesic average of an input vector weighted by a response of the given neuron, where amnesic is a recursive computation of the input vector weighted by the response such that the direction of the feature vector and the variance of signal in the region projected onto the feature vector are both recursively estimated with plasticity scheduling.

28 Claims, 11 Drawing Sheets

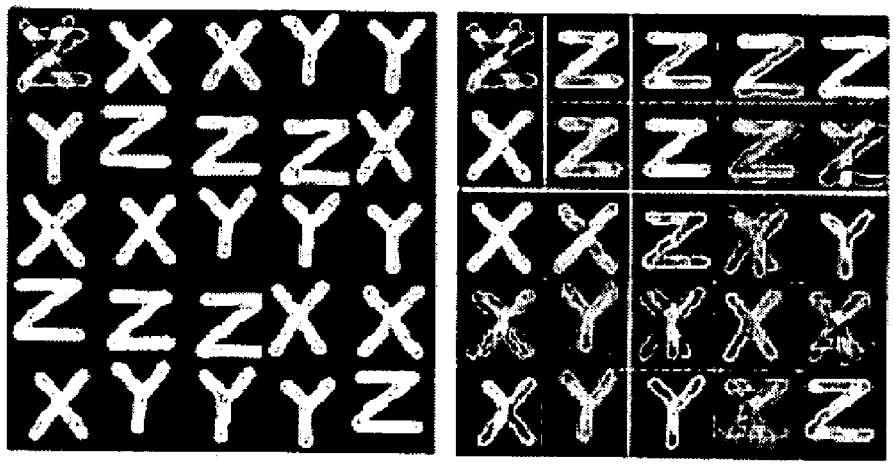
(a) (b)
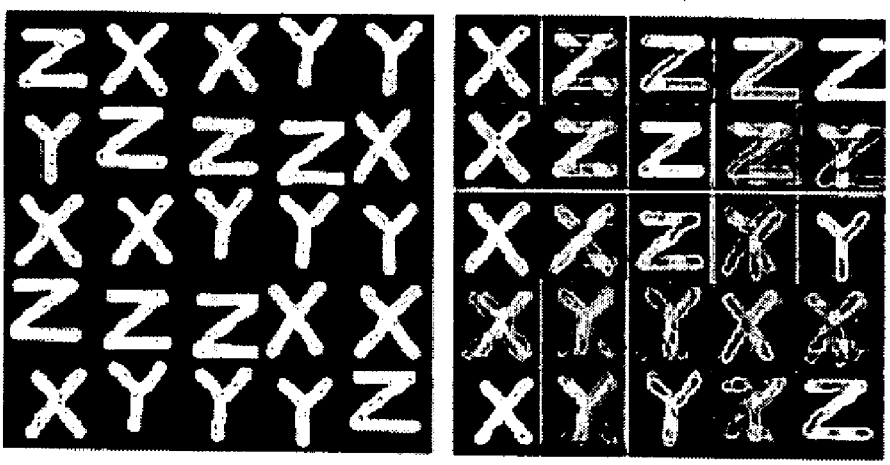
(c) (d)
FIGS. 8A – 8D

(a)

(b)

(c)

(d)

MULTI-LAYER DEVELOPMENT NETWORK HAVING IN-PLACE LEARNING

CROSS-REFERENCE TO RELATED APPLICATIONS

This application claims the benefit of U.S. Provisional Application No. 60/786,257 filed on Mar. 27, 2006. The disclosure of the above application is incorporated herein by reference.

FIELD

The present disclosure relates to biologically inspired developmental networks having in-place learning.

BACKGROUND

A classical study by Blakemore & Cooper 1970 reported that edge detectors are far from being totally innate. If kittens were raised in an environment with only vertical edges, only neurons that respond to vertical or nearly vertical edges were found in the primary visual cortex. Recently, experimental studies have shown how the cortex develops through input-driven self-organization, in a dynamic equilibrium with internal and external inputs. Such dynamic development and adaption occurs from the prenatal stage and continues throughout infancy, childhood, and adulthood. Recently, it has been reported that the spatio-temporal receptive fields and the response of retinal ganglion cells change after a few seconds in a new environment. The changes are adaptive in that the new receptive field improves predictive coding under the new image statistics.

Orientation selective cells in the cortical area V1 are well known, but the underlying learning mechanisms that govern their emergence (i.e., development) are still elusive. Furthermore, complex cells and other cells in V1 that do not exhibit a clear orientation are still poorly understood in terms of their functions and their underlying learning mechanisms. Understanding cortical filter development algorithms is important to address these open problems.

A network is developmental if it can deal with autonomous epigenetic development—namely, it has fully automatic internal self-organization that enables it to autonomously learn a plurality of sensorimotor skills or a plurality of tasks through autonomous interactions with its environment (which may include humans). The work for filter development reported here is fundamentally different from hand-designed filters such as Gabor filters, because the lobe component analysis (LCA) filters presented here are automatically generated (i.e., developed) form signals. Unlike hand-designed filters (e.g., Gabor filters) which wastefully tile the entire input space which is only sparsely sensed, LCA only develops filters to optimally cover all the subparts of input space that have been sensed. Because of this "spectrum finding" property and its use of biological mechanisms found in various cortices, LCA can be potentially used to develop filters for any cortical area e.g., any sensory modalities (vision or audition) for their early, intermediate, or later processing.

In order to understand what the biological cortex detects, how it represents internally and how it develops feature detectors, this disclosure rigorously proposes a classification of learning algorithms, and introduces the concept of in-place learning. Then, it introduces a biologically inspired new concept, called lobe components.

Consider a neuron which takes n inputs, $x=(x_1, x2_1, \ldots x_n)$. The synaptic weight for $x_i$ is $w_i$, $i=1, 2, \ldots, n$ or write $w=(w_1, w_2, \ldots, w_n)$. The response l of a neuron has been modeled by $l=g(w \cdot x)$, where g is a monotone, nonlinear, sigmoid function. The learning (adaptation) of the neuron is characterized by the modification of g and w using input vectors $x_t$, $t=1, 2, \ldots$.

To facilitate understanding of the nature of learning algorithms, we define five types of learning algorithms:

Type-1 batch: A batch learning algorithm $L_1$ computes g and w using a batch of vector inputs $B=\{x_1, x_2, \ldots, x_b\}$, where b is the batch size.

$$(g, w) = L_1(B), \quad (1)$$

where the argument B on the right is the input to the learner, $L_1$ and the right side is its output. The learning algorithm needs to store an entire batch to input vectors B before learning can take place. Since $L_1$ requires the additional storage of B, $L_1$ must be realized by a separate network $L_1$ and thus, the learning of the (learning) network $L_1$ is an open problem.

Type-2 block-incremental: A type-2 learning algorithm, $L_2$, breaks a series of input vectors into blocks of certain size b (b>1) and computes updates incrementally between blocks. Within each block, the processing by $L_2$ is in a batch fashion.

Type-3 incremental: Each input vector must be used immediately for updating the learner's memory (which must not store all the input vectors) and then the input must be discarded before receiving the next input. Type-3 is the extreme case of Type-2 in the sense that block size b=1. A type-2 algorithm, such as Infomax, becomes a Type-3 algorithm by setting b=1, but the performance will further suffer.

Type-4 covariance-free incremental: A Type-4 learning algorithm $L_4$ is a Type-3 algorithm, but furthermore, it is not allowed to compute the $2^{nd}$ or higher order statistics of the input x. In other words, the learner's memory $M^{(t)}$ cannot contain the second order (e.g., correlation or covariance) or higher order statistics of x. The CCI PCA algorithm is a covariance-free incremental learning algorithm for computing principal components as the weight vectors of neurons. Further information regarding this algorithm may be found in a paper by Weng et al entitled "Candid Covariance-free Incremental Principle Component Analysis" IEEE Trans. Pattern Analysis and Machine Intelligence, 25(8):1034-1040 (2003).

Type-5 in-place neuron learning: A Type-5 learning algorithm $L_5$ is a Type-4 algorithm, but further the learner $L_5$ must be implemented by the signal processing neuron N itself. A term "local learning" used by some researchers does not imply in-place. For example, for a neuron N, its signal processor model has two parts, the synaptic weight $w^{(t)}$ and the sigmoidal function $g^{(t)}$, both updated up to t. A type-5 learning algorithm $L_5$ must update them using the previously updated weight $w^{(t-1)}$ and the sigmoidal function $g^{(t-1)}$, using the current input $x_t$ while keeping its maturity indicated by t:

$$(w^{(t)}, g^{(t)}, t) = L_5(w^{(t-1)}, g^{(t-1)}, t-1, x_t). \quad (2)$$

After the adaptation, the computation of the response is realized by the neuron N:

$$y_t = g^{(t)}(w^{(t)} \cdot x_t). \quad (3)$$

An in-place learning algorithm must realize $L_5$ and the computation above by the same neuron N, for $t=1, 2, \ldots$.

Principal components computed from natural images can be used as the weight vectors of neurons. Some of the principal components have a clear orientation, but their orientations are crude (e.g., exhibiting few directions) and their support is not localized (i.e., most synapses have significant magnitudes).

Higher order statistics (e.g., higher-order moments, kurtosis, etc.) have been used in the Independent Component Analysis (ICA). The ICA algorithms search, from higher order statistics of inputs, a set of filters whose responses are statistically as independent as possible. However, the published ICA algorithms are Type-1 and Type-2 algorithms. By these algorithms, every learning neuron requires a dedicated, separate neural network to handle its learning. However, the existence and learning of this separate learning network has largely been left unaddressed. This overlooked obvious problem needs to be resolved not only for any neural learning algorithm to be biologically plausible, but more importantly, for understanding the tightly associated signal processing network.

The concept of in-place learning is based on the following hypothesis. Each neuron with n synaptic weights does not have extra space in itself to store correlation values and other higher-order moments of its input. For example, the covariance matrix of input x requires $(n+1)n/2$ additional storage units. A typical neuron in the brain has about $n=1000$ synapses. The correlations of these n input fibres requires $(n+1)n/2=500,500$ storage units. A Purkinje cell typically has about $n=150,000$ synapses. The correlation of its input vector requires as many as $(n+1)n/2 \approx 1.125 \times 10^{10}$ storage units. It is unlikely that a neuron has so many storage units within its cell body. For example, there is no evidence that the genes, residing in the cell nucleus, record and recall all correlations of cells input fibres.

Surprisingly, by forcing the learning algorithm to be in place, we arrive at a deeper understanding of not only how they learn, but also their functions.

SUMMARY

An in-place learning algorithm is provided for a multi-layer developmental network. The algorithm includes: defining a sample space as a plurality of cells fully connected to a common input; dividing the sample space into mutually non-overlapping regions, where each region is represented by a neuron having a single feature vector; and estimating a feature vector of a given neuron by an amnesic average of an input vector weighted by a response of the given neuron, where amnesic is a recursive computation of the input vector weighted by the response such that the direction of the feature vector and the variance of signal in the region projected onto the feature vector are both recursively estimated with plasticity scheduling.

Further areas of applicability will become apparent from the description provided herein. It should be understood that the description and specific examples are intended for purposes of illustration only and are not intended to limit the scope of the present disclosure.

DRAWINGS

FIGS. 8A-8D illustrate vector weights of a first level neuron developed using input having positional shifts;

The drawings described herein are for illustration purposes only and are not intended to limit the scope of the present disclosure in any way.

DETAILED DESCRIPTION

Figure 1:
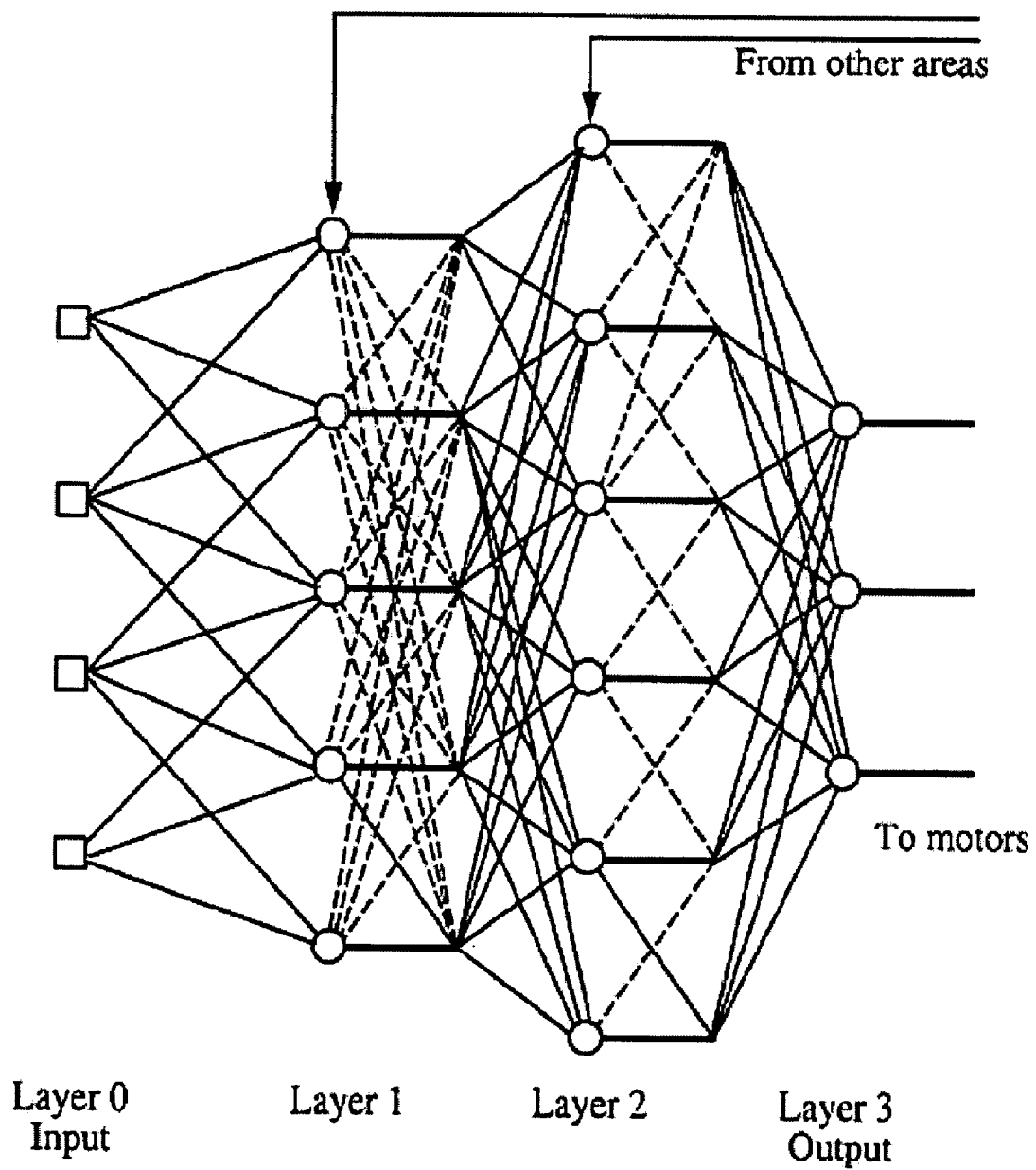
FIG. 1 is a diagram that illustrates an exemplary multi-layer network which may employ in-place learning.

FIG. 1 illustrates an exemplary developmental multi-layer network 10 which may employ in-place learning. The network takes a vector as input (a set of receptors). For vision, the input vector corresponds to a retinal image. For example, the input at time t can be an image frame at time t, or the few last consecutive frames before time t, of images in a video stream. Biologically, each component in the input vector corresponds to the firing rate of the receptor (rod or cones) or the intensity of a pixel. Other types of inputs are also contemplated.

In an exemplary embodiment, the output of the network corresponds to motor signals. For example, each node in the output layer corresponds to the control signal (e.g., voltage) of a motor. Mathematically, this kind of network that produces numerical vector outputs is called regressor. This network can also perform classification. For example, the number of nodes in the output layer is equal to the number of classes. Each neuron in the output layer corresponds to a different class. At each time instant t, the neuron in the output layer that has the highest output corresponds to the class that has been classified. Other types of outputs from the network are also contemplated.

For biological plausibility, assume that the signals through the lines are non-negative signals that indicate the firing rate. Two types of synaptic connections are possible, excitatory and inhibitory. An excitatory connection is represented by a positive sign which increases the firing potential of the cell. An inhibitory connection is represented by a negative sign, which reduces the firing potential of the cell.

In FIG. 1, the network is shown a recurrent network. The output from each layer is not only used as input for the next layer, but is also feedback into other neurons in the same layer through lateral inhibition (dashed lines in the figure). For each neuron i, at layer l, there are three types of weights: 1) bottom-up (excitatory) weight vector $w_b$ that links input lines from the previous layer l−1 to this neuron; 2) lateral (inhibitory) weight $w_h$ that links other neurons in the same layer to this neuron; and 3) top-down (excitatory or inhibitory) weight $w_t$. It includes two parts: (a) the part that links the output from the neurons in the next layer l+1 to this neuron; and (b) the part that links the output of other layer processing areas (e.g., other sensing modality) or layers (e.g., the motor layer) to this neuron i. For notational simplicity, we only consider excitatory top-down weight, which selects neurons selected to increase their potential values. Inhibitory top-down connection can be used if the primary purpose is inhibition (e.g., inhibition of neurons that have not been selected by attention selection signals).

Assume that this network computes in discrete times, t=0, 1, 2, . . . , as a series of open-ended developmental experience after the birth at time t=0. This network incorporates unsupervised learning, supervised learning and reinforcement learning through the developmental process. When the desired action is available to be imposed on the motor layer, the network performs supervised learning. When the desired action is not available but the predicted values of a few top choices of outputs from the network are available, the network is used to perform reinforcement learning by producing the action that has the best predicted value. When none of the desired action nor the predicted values for the top choices of outputs are available, the network performs unsupervised learning and produces an output vector at the output layer based on its recurrent computation. For supervised learning, the desired output at the output layer at time t is set (imposed) by the external teacher at time t. Because the adaptation of each neuron also uses top-down weights, the imposed motor signal at the output layer affects which neuron wins and updates. The current output in the output layer also affects the learning of the previous layer through top-down projection. Such top-down projections recursively affect earlier layers. While an exemplary multi-layer network is described above, it is understood that broader aspects of the in-place learning algorithm described below are suitable for other network configurations.

Figure 2:
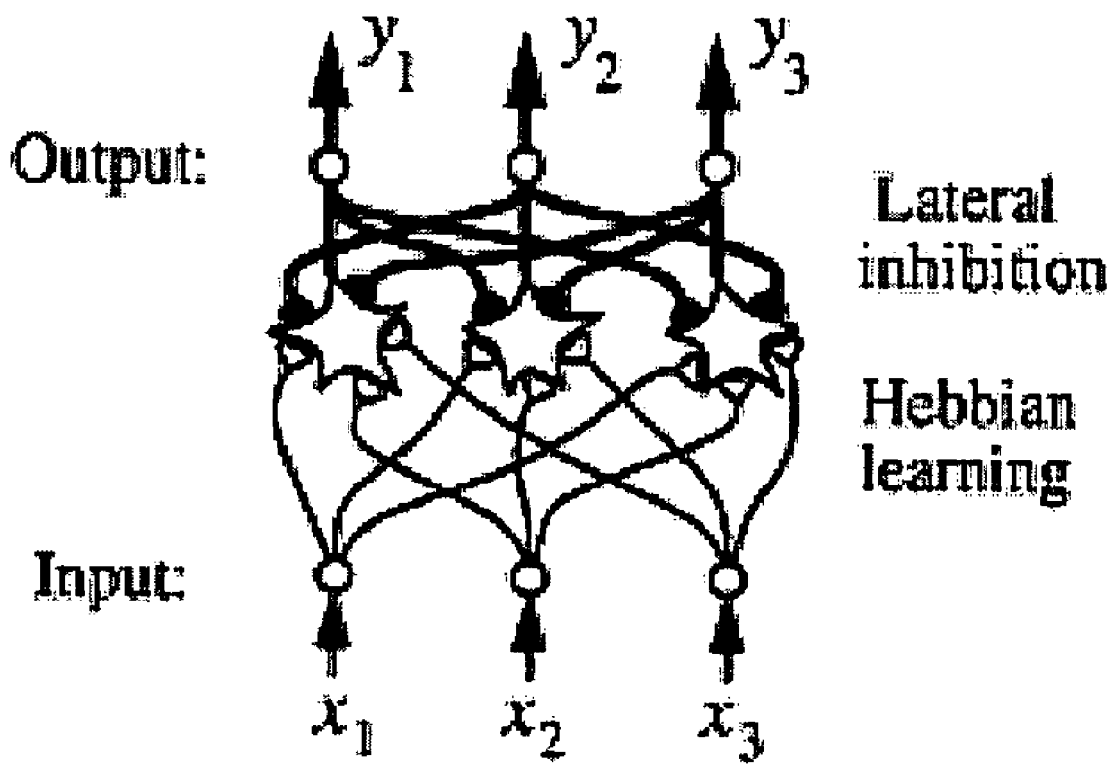
FIG. 2 is a diagram that illustrates how neighboring neurons share the same input space and are connected though lateral inhibition.

FIG. 2 illustrates how neighboring neurons share the same vector of inputs x and how they are connected through lateral inhibition from the output of neighboring neurons. According to the above model, the input to the i-th neuron in a layer consists of two parts, the excitatory part x and the inhibitory part z:

$$z_i = g(w \cdot x - h \cdot z) \quad (4)$$

where w consists of nonnegative weights for excitatory input x, while h consists of nonnegative weights for nonnegative inhibitory input z but its i-th component is zero so that the right side does not require $z_i$. For biological plausibility, we assume that all the components in x and z are nonnegative. The source of z is the response of neighboring neurons in the same layer.

The nature of inhibition is indicated by the minus sign before h·z in Eq. (4). In other words, the higher the response from neighboring neurons, the weaker the response is from this neuron. Vice versa, the higher the response from this neuron, the more effectively this neuron inhibits other neighboring neurons. Given an input vector $x_t$, such a process of lateral inhibition reaches equilibrium quickly.

Therefore, the net effect of lateral inhibition is the sparsity of the cortical response from each given input x. Only relatively few winners fire. Many more neurons do not fire compared to the case without lateral inhibition. In the computation, we simulate the effect of lateral inhibition to allow only top k winners to fire, where k is a positive number.

The Hebbian rule is well known and it has many forms. The basic form of the Hebbian rule is expressed as $$\tau_w \frac{dw}{dt} = E\{\upsilon x\} \quad (5)$$

where $\tau_w$ is a time constant (or step size) that controls the rate at which the weight w changes, and the operator E denotes expectation (i.e., average) over observations x and $\upsilon = w \cdot x$. In general, the Hebbian rule means that the learning rate of a neuron is closely related to the product of its current response and the current input, although the relation is typically nonlinear. Plug $\upsilon = w \cdot x$ into Eq. (5), we get $$\tau_w \frac{dw}{dt} = E\{(w \cdot x)x\}.$$

The above expression gives rise to the need to compute the correlation matrix of x in many learning algorithms, resulting in Type-1 and Type-2 algorithms in unsupervised learning.

In supervised learning, different forms of the Hebbian rule can be derived from different error functions $f(w)$, using the gradient of the objective function with respect to the weight vector w. Consider the error function as the height of a natural terrain. Gradient at position w is the direction along which the objective function increases the quickest (i.e., the uphill direction). To reduce the objective function, the weight vector w should be modified along the opposite direction of the gradient. Methods of this type are simple and mathematically intuitive. However, gradient is a local characteristic of the error function. Although the current position w during a gradient-based search is a consequence of previous iterative search steps, the gradient does not consider the history of the past search. Because of this limitation, it does not provide any information about the optimal plasticity of w. For example, it does not tell what the learning rate for w should be.

The in-place learning algorithm presented below deals with supervised learning, unsupervised learning, reinforcement learning, or a combination of all three. If the input space contains only bottom-up (ascending) connections and lateral connections, the learning algorithm deals with unsupervised learning. If the input space contains, also contains top-down connections (descending) connections, the learning algorithm deals with supervised learning. If the selection of output depends on a predicted values of candidate outputs, the network performs reinforcement learning.

Figure 3:
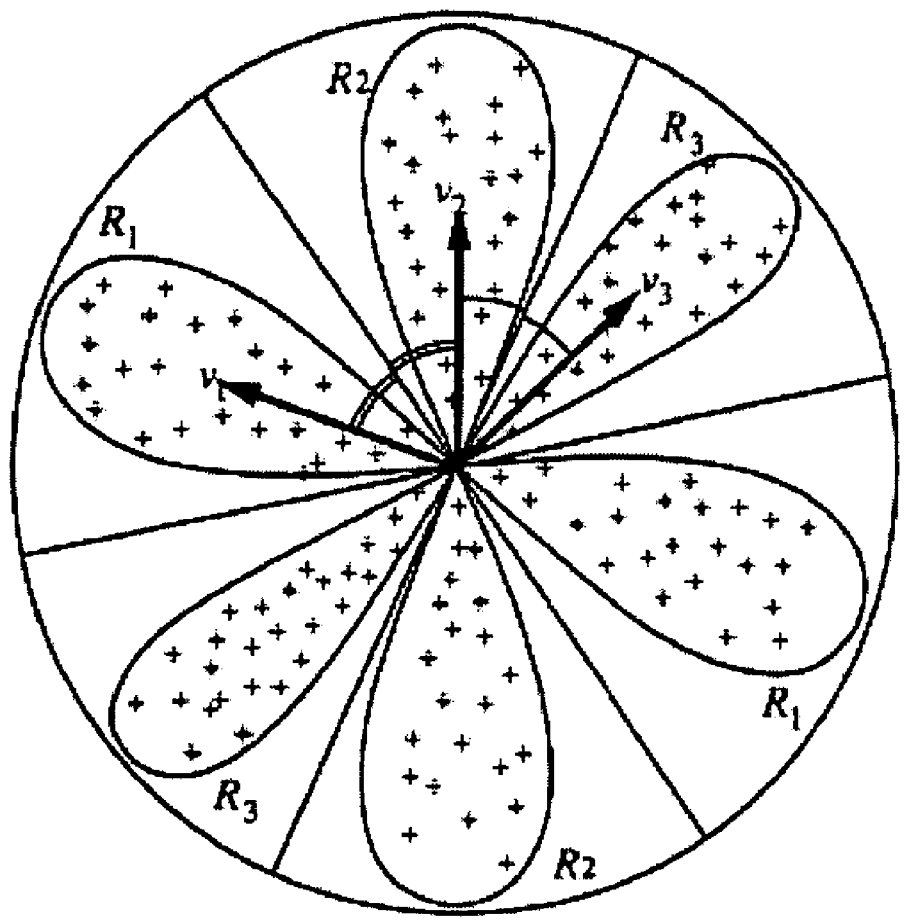
FIG. 3 is a diagram of an exemplary sample space

Atick and coworkers proposed that early sensory processing decorrelates inputs. Weng et al. proposed an in-place algorithm that develops a network that whitens the input. A whitened output vector has a unit variance (i.e., "energy") for every line and all zero inter-line correlations. Therefore, we can assume that prior processing has been done so that its output vector y is white. From now on, we assume that the input is y. In the visual pathway, the early cortical processing does not totally whiten the signals, but they are weakly correlated. The sample space of a k-dimensional white (i.e., components have unit variance and they are pairwise uncorrelated) input random vector y can be illustrated by a k-dimensional hypersphere, as shown in FIG. 3.

A concentration of the probability density of the input space is called a lobe, which may have its own finer structure (e.g., sublobes). The shape of a lobe can be of any type, depending on the distribution, not necessarily like the petals in FIG. 3. If we assume that x and −x are equally likely (e.g., a patch of skin will have the equal chance of feeling the onset and the offset of a press), the distribution is then symmetric about the origin. This is not necessarily true in general and, consequently, nonsymetric lobes can be defined.

Given a limited cortical resource, c cells fully connected to input y, the developing cells divide the sample space Y into c mutually nonoverlapping regions, called lobe regions:

$$Y = R_1 \cup R_2 \cup \ldots \cup R_c, \quad (6)$$

(where ∪ denotes the union of two spaces) as illustrated in FIG. 3. Each region $R_i$ is represented by a single unit feature vector $v_i$ called the lobe component. Given an input y, many cells, not only $v_i$, will respond whose pattern forms a population representation of y. This partition idea is similar of Kohonen's Self Organizing Maps (SOM), or more generally, vector quantization.

The next issue is how neurons, compute the lobe regions without a supervisor (i.e., by in-place mechanisms). Suppose that a unit vector (neuron) $v_i$ represents a lobe region $R_i$. If y belongs to $R_i$, y can be approximated by $v_i$ as the projection onto $v_i$: $y \approx \hat{y} = (y \cdot v_i)v_i$. Suppose the neuron $v_i$ minimizes the mean square error $E\|y-\hat{y}\|^2$ of this representation when y belongs to $R_i$.

From the theory of principal component analysis (PCA), we know that the best solution of column vector $v_i$ is the principal component of the conditional covariance matrix $\Sigma_{y,i}$, conditioned on y belonging to $R_i$. That is $v_i$ satisfies $\lambda_{i,1} v_i = \Sigma_{y,i} v_i$.

Replacing $\Sigma_{y,i}$ by the estimated sample covariance matrix of column vector y, we have $$\lambda_{i,1} v_i \approx \frac{1}{n} \sum_{t=1}^{n} y(t)y(t)^T v_i = \frac{1}{n} \sum_{t=1}^{n} (y(t) \cdot v_i) y(t). \quad (7)$$

We can see that the best lobe component vector $v_i$, scaled by "energy estimate" eigenvalue $\lambda_{i,1}$, can be estimated by the average of the input vector y(t) weighted by then linearized (without g) response to $y(t) \cdot v_i$ whenever y(t) belongs to $R_i$. This average expression is very important in guiding the adaptation of $v_i$ in the optimal statistical efficiency as explained below.

In order to minimize the chance of false extrema and to optimize the speed to reach the desired feature solution, we use a concept in statistics called efficiency. Suppose that there are two estimators $\Gamma_1$ and $\Gamma_2$, for vector parameter (i.e., synapse or feature vector) $\theta = (\theta_1 \ldots \theta_k)$, which are based on the same set of observations $S = \{x_1, x_2, \ldots, x_n\}$. If the expected square error of $\Gamma_1$ is smaller than that of $\Gamma_2$ (i.e., $E\|\Gamma_1-\theta\|^2 < E\|\Gamma_2-\theta\|^2$), the estimator $\Gamma_1$ is more statistically efficient that $\Gamma_2$. Given the same observations, among all possible estimators, the optimally efficient estimator has the smallest possible error.

For in-place development, each neuron does not have extra space to store all the training samples y(t). Instead, it uses its physiological mechanisms to update synapses incrementally. If the i-th neuron $v_1(t-1)$ at time t-1 has already been computed using previous t-1 inputs y(1), y(2), ..., y(t-1), the neuron can be updated into $v_1(t)$ using the current sample defined from y(t) as:

$$x_t = \frac{y(t) \cdot v_i(t-1)}{\|v_1(t-1)\|} y(t). \quad (8)$$

Then Eq. (7) states that the lobe component vector is estimated by the average:

$$\lambda_{i,1} v_i \approx \frac{1}{n} \sum_{t=1}^{n} x_t. \quad (9)$$

Statistical estimation theory reveals that for many distributions (e.g., Gaussian and exponential distributions), the sample mean is the most efficient estimator of the population mean. This follows directly from Theorem 4.1 of Lehmann (see E. L. Lehmann. Theory of Point Estimation. John Wiley and Sons, Inc. New York (1983)), which states that under some regularity conditions satisfied by most distributions (such as Gaussian and exponential distributions), the maximum likelihood estimator (MLE) $\hat{\theta}$ of the parameter vector $\theta$ is asymptotically efficient, in the sense that its asymptotic covariance matrix is the Cramér-Rao information bound (the lower bound) for all unbiased estimators, via convergence in probability to a normal distribution:

$$(\hat{\theta} - \theta) \xrightarrow{P} N\{0, I(\theta)^{-1}/n\} \quad (10)$$

in which the Fisher information matrix $I(\theta)$ is the covariance matrix of the score vector $$\left\{ \frac{\partial f(x, \theta)}{\partial \theta_1}, \ldots, \frac{\partial f(x, \theta)}{\partial \theta_k} \right\},$$

and $f(x,\theta)$ is the probability density of random vector x if the true parameter value is $\theta$. The matrix $I(\theta)^{-1}$ is called information bound since under some regularity constraints, any unbiased estimator $\tilde{\theta}$ of the parameter vector $\theta$ satisfies cov($\tilde{\theta}-\theta$) $\geq I(\theta)^{-1}/n$.

Since in many cases the MLE of the population mean is the sample mean, we estimate the mean $\theta$ of vector x by the sample mean. Thus, we estimate an independent vector $\lambda_1 v_i$ by the sample mean in Eq. (9), where $x_t$ is a "random observation".

Although the conditions on the distribution of $x_t$ are mild, $x_t$ depends on the currently estimated $v_i$. That is, the observations of $x_t$ are from a non-stationary process. In general, the environments of a developing system change over time. Therefore, the sensory input process is a non-stationary process too. We use the amnesic mean technique below which gradually "forgets" old "observations" (which use bad $x_t$ when t is small) while keeping the estimator quasi-optimally efficient.

The mean in Eq. (9) is a batch method. For incremental estimation, we use what is called an amnesic mean.

$$\bar{x}^{(t)} = \frac{t - 1 - \mu(t)}{t} \bar{x}^{(t-1)} + \frac{1 + \mu(t)}{t} x_t \quad (11)$$

where $\mu(t)$ is the amnesic function depending on t. If $\mu=0$, the above gives the straight incremental mean. The way to compute a mean incrementally is not new but the way to use the amnesic function of n is new for computing a mean incrementally.

$$\mu(t) = \begin{cases} 0 & \text{if } t \leq t_1, \\ c(t - t_1)/(t_2 - t_1) & \text{if } t_1 < t \leq t_2, \\ c + (t - t_2)/r & \text{if } t_2 < t, \end{cases} \quad (12)$$

in which, e.g., c=2, r=10000. As can be seen above, $\mu(t)$ has three intervals. When t is small, straight incremental average is computed. Then μ(t) changes from 0 to 2 linearly in the second interval. Finally, t enters the third section where μ(t) increases at a rate of about 1/r, meaning the second weight (1+μ(t))/t in Eq. (11) approaches a constant 1/r, to slowly trace the slowly changing distribution.

We consider whether the amnesic mean is an unbiased estimator. From the recursive definition of the amnesic mean in Eq. (11), we can see that the amnesic mean $\bar{x}(n)$ is a weighted sum of the involved data $x_t$:

$$\bar{x}(n) = \sum_{t=1}^{n} w_t(n) x_t,$$

where $w_t(n)$ is the weight of data item $x_t$ which entered at time $t \leq n$ in the amnesic mean $\bar{x}(n)$. It can be proven using induction on n that the weight $w_t(n)$ is given by the following expression:

$$w_t(n) = \frac{1 + \mu(t)}{t} \prod_{j=t+1}^{n} \frac{j - 1 - \mu(j)}{j}. \quad (13)$$

Since all the multiplicative factors above are non-negative, we have $w_t(n) \geq 0$, $t=1, 2, \ldots, n$. Using the induction on n, it can be proven that all the weights $w_t(n)$ sum to one for any $n \geq 1$:

$$\sum_{t=1}^{n} w_t(n) = 1. \quad (14)$$

(When n=1, we require that μ(1)=0.) Suppose that the sample $x_t$ are independently distributed (i.i.d.) with the same distribution as a random variable x. Then, the amnesic mean is an unbiased estimator of Ex:

$$E\bar{x}(n) = E \sum_{t=1}^{n} w_t(n) x_t = \sum_{t=1}^{n} w_t(n) E x_t$$
$$= \sum_{t=1}^{n} w_t(n) E x = E x.$$

Let cov (x) denote the covariance matrix of x. The expected mean square error of the amnesic mean $\bar{x}(n)$ is $$\operatorname{cov}(\bar{x}(n)) = \left( \sum_{t=1}^{n} w_t^2(n) \right) \operatorname{cov}(x) = c(n) \operatorname{cov}(x), \quad (15)$$

where we defined the error coefficient:

$$c(n) = \sum_{t=1}^{n} w_t^2(n).$$

When μ(t)=0 for all n, the error coefficient becomes c(n)=1/n and Eq. (15) returns to the expected square error of the regular sample mean:

$$\operatorname{cov}(x(n)) = \frac{1}{n} \operatorname{cov}(x). \quad (16)$$

Figure 4:
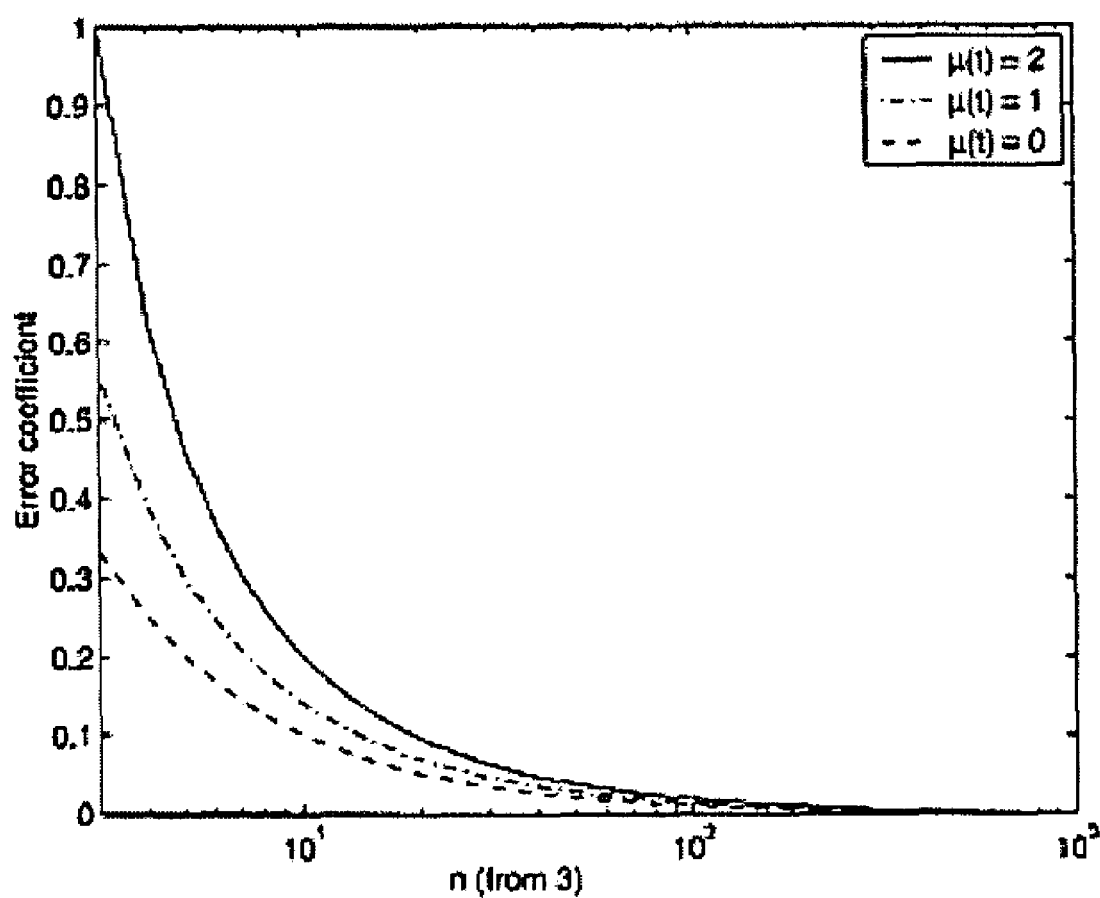
FIG. 4 is a graph showing the error coefficient for three different amnesic functions.

It is then expected that the amnesic mean for a stationary process will not have the same efficiency as the straight sample mean for a stationary process. FIG. 4 shows the error coefficient c(n) for three different amnesic functions μ(t)=2, μ(t)=1 and μ(t)=0. The smaller the error coefficient, the smaller the expected square error, but also there is less capability to adapt to a changing distribution. The three cases shown in FIG. 4 indicate that when n>10, the amnesic mean with μ(t)=1 increased about 50% (for the same n) from that for μ(t)=0 with μ(t)=2 it increased about 100%.

From FIG. 4 we can see that a constant positive μ(t) is not best when t is small. The multi-sectional amnesic function μ(t) in Eq. (12) performs straight average for small t to reduce the error coefficient for earlier estimates, and when t is very large, the amnesic function changes with t to track the slowly changing distribution. Therefore, the multi-sectional amnesic function μ(t) is more suited for practical signals with unknown nonstationary statistics. It is appropriate to note that the exact optimality of the multisectional amnesic function is unlikely under an unknown nonstationary process (not i.i.d.), unless an assumption of certain types of nonstationary process is imposed, which is not, however, necessarily true in reality.

Therefore, each neuron can use the amnesic mean technique (i.e., time-varying plasticity), which gradually "forgets" old "observations" (which use "bad" $x_t$ when t is small) while keeping the estimator reasonably efficient (quasi-optimally efficient) for a nonstationary process, as shown in Eq. 11. The amnesic function μ(t) represents the "critical window" of neuronal plasticity imbedded into the genetic and physiological mechanism of a neuron.

We model the development (adaptation) of an area of cortical cells (e.g., a cortical column) connected by a common input column vector y by following Candid Covariance-free Incremental Lobe Component Analysis (CCI LCA) (Type-5) algorithm, which incrementally updates c such cells (neurons) represented by the column vectors $v_1^{(t)}, v_2^{(t)}, \ldots, v_c^{(t)}$ from input samples y(1), y(2), . . . of dimension k without computing the k×k covariance matrix of y. The length of the estimated $v_1$, its eigenvalue, is the variance of projections of the vectors y(t) onto $v_1$. The quasi-optimally efficient, in-place CCI LCA algorithm is as follows:

1) Sequentially initialize c cells using first c observations:

$v_t^{(c)} = y^{(t)}$ and set cell-update age n(t)=1, for t=1, 2, . . . , c.

2) For t=c+1, c+2, . . . , do
   a) Compute the membrane potential for all neurons: For all i with $1 \leq i \leq c$:

$$z_i = \frac{y(t) \cdot v_i^{(t-1)}}{\|v_i^{(t-1)}\|} \quad (17)$$

The firing rate of the neuron i is $r_i = g_i(z_i)$, where g is the sigmoidal function of neuron $_i$. In a multilayer network, the $v_i$ includes three parts: bottom-up weight, laternal weight, and top-down weight.

b) (i) Top-k response version: Simulating lateral inhibition, decide the top-k winners the firing rates, where k>0.
  (ii) Dynamic response version: The lateral inhibition is computed directly using laternal inhibitory connections for every neuron and, thus, the total number of neurons that fire in each layer is dynamic.
c) Update only the winner (or firing) neuron $v_j$ using its temporally scheduled plasticity:

$$v_j^{(t)} = w_1 v_j^{(t-1)} + w_2 z_j y(t),$$

where the scheduled plasticity is determined by its two age-dependent weights:

$$w_1 = \frac{n(j) - 1 - \mu(n(j))}{n(j)}, \ w_2 = \frac{1 + \mu(n(j))}{n(j)},$$

with $w_1 + w_2 \equiv 1$. (That is, the bottom-up, lateral and top-down weights are all updated for the firing neuron.) Update the number of hits (cell age) $n(j) \leftarrow +n(j)+1$.

d) All other neurons keep their ages and weight unchanged: For all $1 \leq i \leq c, i \neq j, v_i^{(t)} = v_i^{(t-1)}$.

The neuron winning mechanism corresponds to the well known mechanism called lateral inhibition (see, e.g., Kandel et al. Principles of Neural Science. McGraw-Hill, New York pg 4623 (2000)). The winner updating rule is a computer simulation of the Hebbian rule (see, e.g., Kandel et al at pg 1262). Assuming the plasticity scheduling by $w_1$ and $w_2$ are realized by the genetic and physiologic mechanisms of the cell, this algorithm is in-place.

Instead of updating only the top-1 neuron, using biologically more accurate "soft winners" where multiple top (e.g., top-k) winners update, we have obtained similar results. This in-place algorithm is simple. Given each k-dimensional input y, the time complexity for updating c cells and computing all the response for each y is merely O(ck). With t inputs, the total time complexity is O(ckt). The space complexity is only O(ck).

Further, these space and time complexities are also the lowest possible ones, since c cells need to be computed and each vector has k synapses.

From the discussed meaning of lobe components, we can infer that LCA is ICA for super-Gaussians. Natural images are mostly super-Gaussian.

In the above CCI LCA algorithm, we assume that neurons in the same layer are mutually related only through their synaptic weights. However, biological neurons are located physically along a two-dimensional sheet (cortical sheet). An important concept of the biological cortex, which is also of great importance to artificial networks, is self-organized modularity: neurons that represent similar concepts (e.g., human faces) are located nearby within the cortex. The modularity property enables certain conceptual generalizations through nearby connections since nearby neurons represent conceptually similar concepts.

In the above CCI LCA algorithms, neurons are related only by their synaptic weights. Each neuron can be physically located in any place. Next, we assume additionally that the neurons reside in a 2-D surface (e.g., the 2-D cortex), to enable self-organization within the 2-D surface resulting in what is called a topographic map. In a topographic map, neurons that represent similar features are near. The CCI LCA algorithm can be slightly modified so that not only the winner updates its synaptic weights, but also its 3×3 neighbors, which results in the topographic LCA map to be shown in the experimental section. Although SOM and its published variants does develop feature maps, they do not have the concept of lobe components in high-dimensional distribution, quasi-invariance and quasi-optimal efficiency.

As we discussed earlier, object-by-object learning, is effective to learn invariance in a global way. However, it does not provide a mechanism that enables the sharing of local invariance or parts.

Without the top-down part, the algorithm discussed above conducts unsupervised learning. However, invariance is effective under supervision. For example, different positions, scales of an object part can be learned by the same set of neurons at a certain layer if some "soft" supervision signal is available at that layer. Then, at the output layer, the global invariance can be more effectively achieved and using fewer examples, by taking advantage of local invariance developed by neurons in the earlier layer. The key is how to provide such "soft" supervision signals at early layers.

The top-down part of a neuron response requires input from later processing. However, for digital networks, the output from later layers for the current input is not available until after the current layer has computed. Assuming that the network samples the world at a fast pace so that the response of each layer does not change too fast compared to the temporal sampling rate of the network, we can then use the output from the later layers at t−1 as the supervision signal. Denoting the response vector at layer l at time t to be vector $y^{(l)}(t)$ and its i-th component to be $y_i^{(l)}(t)$, we have the model for computation of this supervised and unsupervised network, for each neuron i at layer l:

$$y_i^{(l)}(t) = g_i^{(l)}(w_b \cdot y^{(l-1)}(t) - w_h \cdot y^{(l)}(t) + w_t \cdot a(t-1)). \quad (18)$$

Note that the i-th component in $w_h$ is zero, meaning that neuron i does not use the response of itself to inhibit itself In other words, the output from the later layers a can take the previous one a(t−1). Using this simple model, the belongingness can take into account not only unsupervised belongingness if $y^{(l-1)}(t)$ but also the supervised belongingness enabled by a(t−1). For example, when the firing neurons at a layer fall into the receptive field selected by the attention selection signal represented by a(t−1), its belongingness is modified dynamically be the supervised signal a. Therefore, the region that belongs to a neuron can be a very complex nonlinear manifold determined by the dynamic supervision signal (e.g. attention), achieving quasi invariance locally within every neuron of early layers and global invariance at the output layer.

Figure 5:
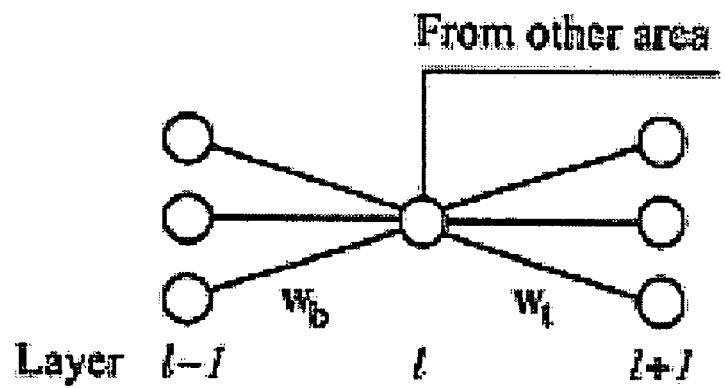
FIG. 5 is a diagram showing bottom-up and top-down projection of a neuron.

The next key issue is whether the single-layer in-place learning algorithm can be directly used when the top-down part $w_t \cdot a(t-1)$ is incorporated into the input of every neuron. Let us discuss two cases for the top-down factor a and its weight vector $w_t$, as shown in FIG. 5: (a) The part that corresponds to the output from the next layer. Since the fan-out vector $w_t$ from neuron i corresponds to the weight vector linking to a, the inner product $w_t \cdot a$ directly indicates how much the current top-down part supervises the current neuron i. (b) The part that corresponds to the output from other areas. Again, the corresponding part into the top-down factor $w_t$ indicates how the supervision should be weighted in $w_t \cdot a$. In summary, by including the supervision part a, the single-layer in-place learning algorithm can be directly used.

The following is the multi-layer in-place learning algorithm. Suppose that the network has L layers.

MILN Learning: For t=0, 1, 2, . . . do the following:
1) Grab the current input frame.
2) If the current desired output frame is available, set the output of the output layer L.
3) For j=1, 2, . . . , L, run the single-layer in-place learning algorithm on layer j, using Eq. (17) for computing response.

Figure 6:
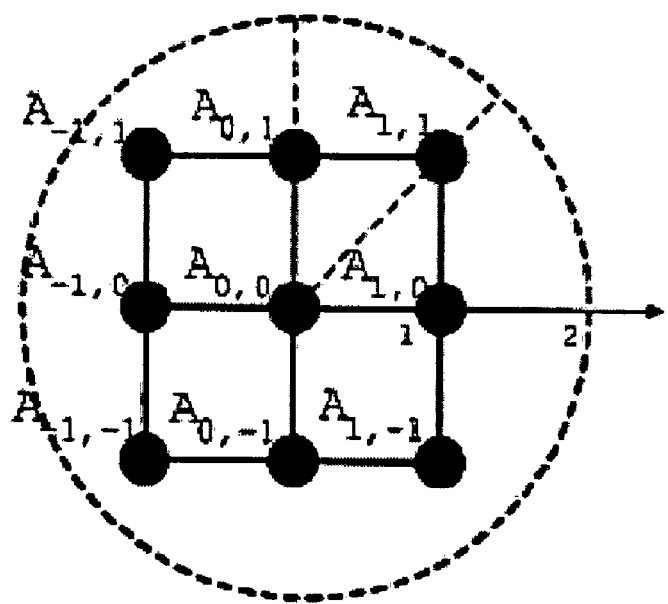
FIG. 6 is a diagram showing neighboring neurons for a winning neuron.

First, we explain some details about the implementations. In the above discussion, the neurons can reside at any locations and their locations are independent of their weights. The concept of modularization is that neurons that detect similar features are nearby. We assume that neurons lie in a 2-D "cortical" surface S. The resulting modularity encourages local connections while allowing generalization based on 2-D neighborhood. Thus, the modularization can be realized by updating not only the winner, but also nearby neurons. In the experiment, not only the winner neuron $A_{0,0}$ at location (0,0) in S is updated, but also its 3×3 neighbors in S, as shown in FIG. 6.

The weights for updating neuron A(i,j) was computed as follows:

$$W_{i,j}=e^{-d_{i,j}}, \text{where } d_{i,j}=i^2+j^2. \quad (19)$$

This weight modifies $w_2$ in the CCI LCA algorithm through a multiplication, but the modified $w_1$ and $w_2$ still sum to one.

For sparse-coding which is the result of lateral inhibition, we only allow k neurons in each layer to have non-zero response. The output of the top i-th ranked neuron has a response $$l' = \frac{k-i+1}{k}l \text{ if } i<k,$$

where l is the original response. All other neurons with i≧k are suppressed to have zero responses.

Figures 7A, 7B:
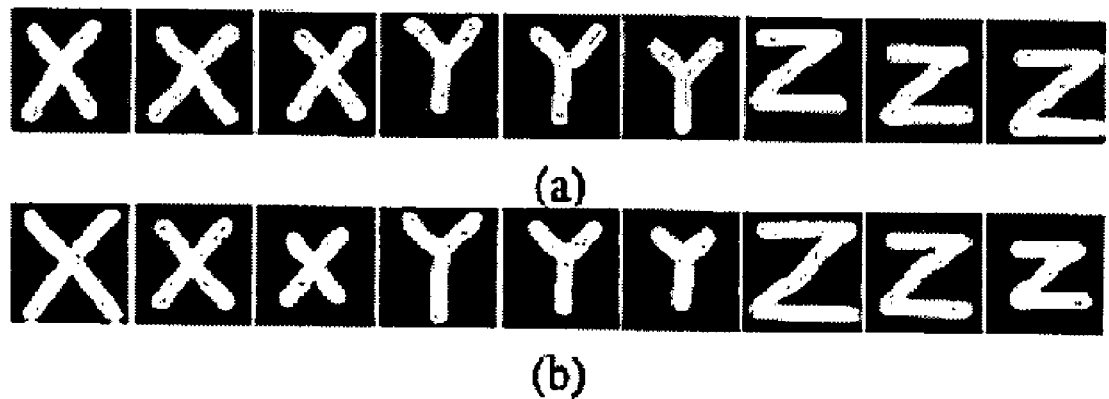
FIGS. 7A and 7B illustrates two exemplary set of input.
Figure 9A:
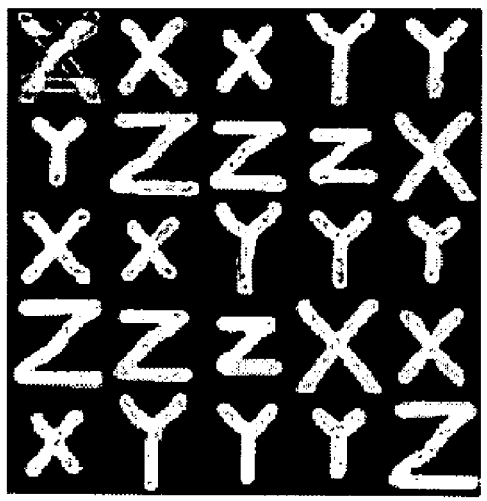
FIGS. 9A-9D illustrate vector weights of a first level neuron developed using input having scaling variations.
Figure 9B:
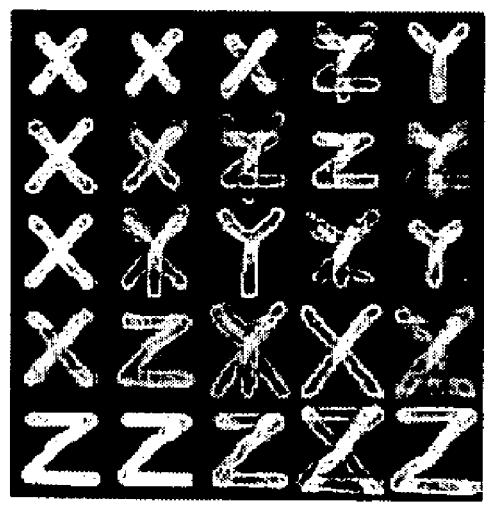
Figure 9C:
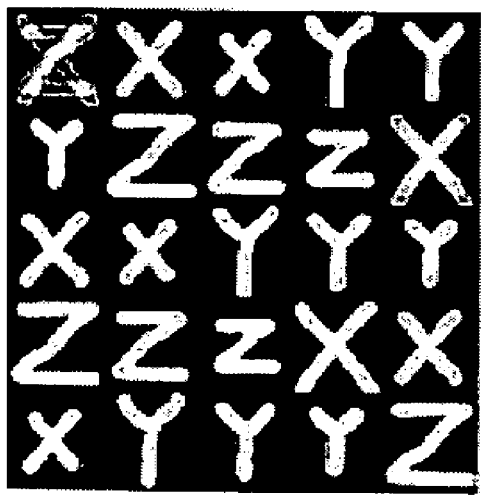
Figure 9D:
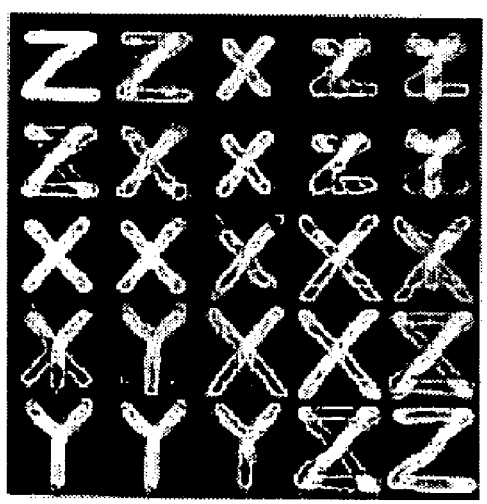

The main purpose of this example is to facilitate understanding. For this example, the input images are classed into 3 classes, X, Y, Z. For clarity, we collected two small sets of training samples, containing 9 samples in each. The shift set and scaled set mainly show variations, respectively, as shown in FIGS. 7A and 7B.

It is important to note that a 2-layer network with a sufficient number of neurons in both layers in logically sufficient to classify all the training samples, according to the nearest neighbor rule realized by the CCI LCA algorithm using the top-1 winner. However, this is not an interesting case. In practice, the number of neurons is much smaller than the number of sensed sensory inputs.

Then, what are the major purposes of a hidden layer? With attention selection and different receptive fields into the early layers, a later hidden layer is able to recognize an object from its parts. If the earlier layers have developed invariant features, a later hidden layer is able to recognize an object from its invariant parts detection.

Therefore, in the experiment conducted here, our goal is not exactly to do perfect classification, but rather, to visualize the effects of the introduced mechanisms. Only when these effects are well understood, can we understand the pros and cons of the introduced developmental mechanisms.

In this example, we decided that the network has three layers. The numbers of neurons from layer 1 through layer 3 are 5×5=25, 3×3=9 and 3 respectively. The supervision signals for the output layer are (1,0,0), (0,1,0) and (0,0,1), respectively. The number k is set to 5 at layer 1 and 3 at layer 2, so that the first and the second layers have 5 and 3 non-zero firing neurons, respectively. The 9 samples in each set were reused 500 times to form a long input stream. Note that in layer 1, the number of neurons is larger than the number of samples in this special case.

FIGS. 8 and 9 give the developed weights of the first level neurons, using the two different training sets, respectively. First, compared to top-1 updating, top-9 updating has a tendency to smooth across samples, as we expected. Second, although a two-layer network with top-1 updating showed a perfect supervision (which guarantees that each neuron in layer-1 averages only samples of the same class), the same is not true for the three-layer network shown here. Although it can be observed that the supervised learning trends to average across samples of the same class, some occasional opposite cases do exist. Under the limited resource and soft supervision from succeeding layers, perfect invariant features are impossible. Then, is it true that global invariance is achieved through quasi-invariance shown by the cells shown in FIGS. 8A-8D and y> Further research is needed to address this more complex question.

Figure 10:
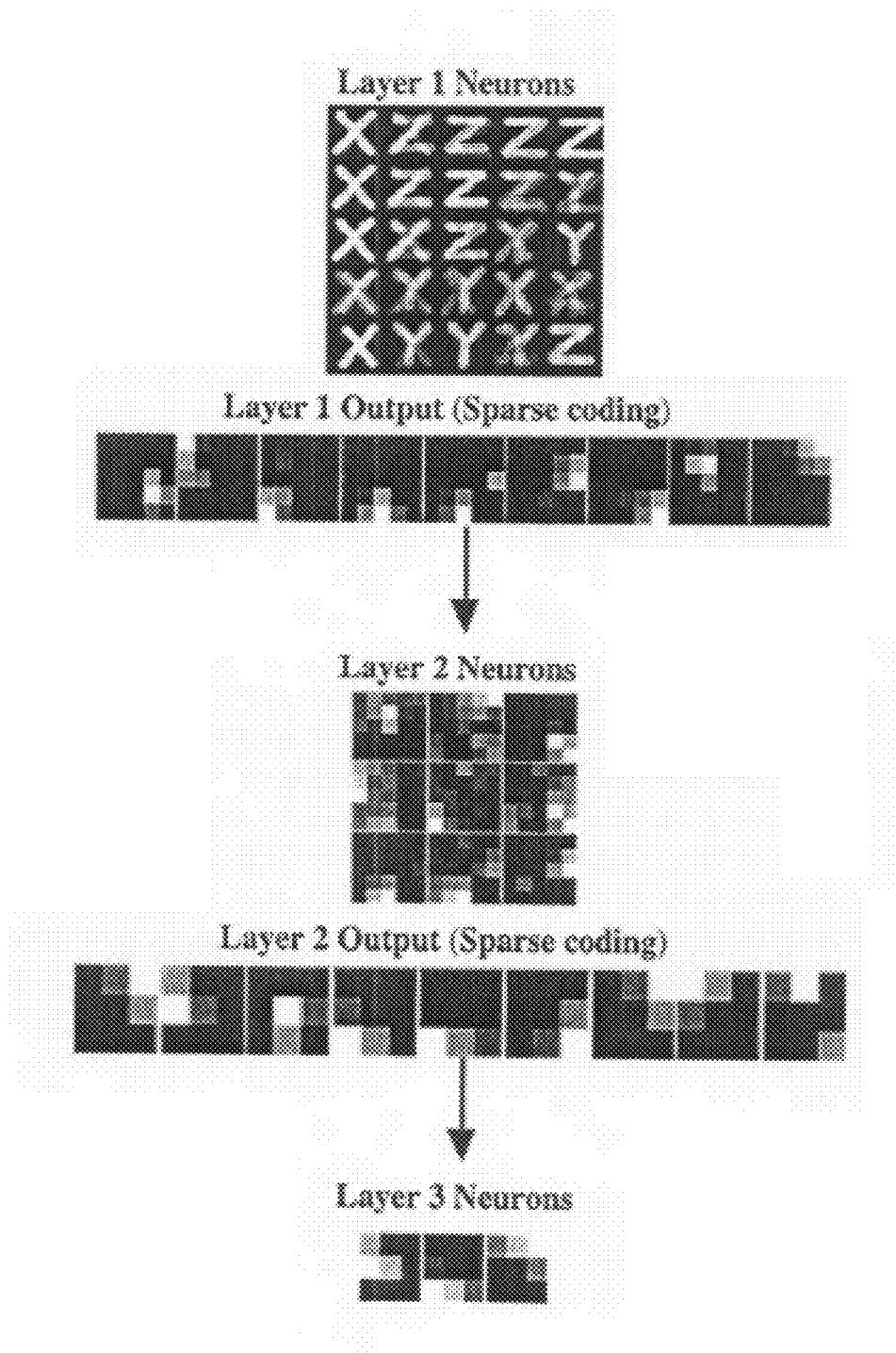
FIG. 10 illustrates neuron weights at different layers using supervised learning.

FIG. 10 shows the neuron weights at different layers using supervised learning from the training set the positional variations. Top-9 update was used. From the images of the neuronal synapses, we can see that the classification, and thus invariance, requires cooperation between neurons at different retinal position and layers.

Figure 11:
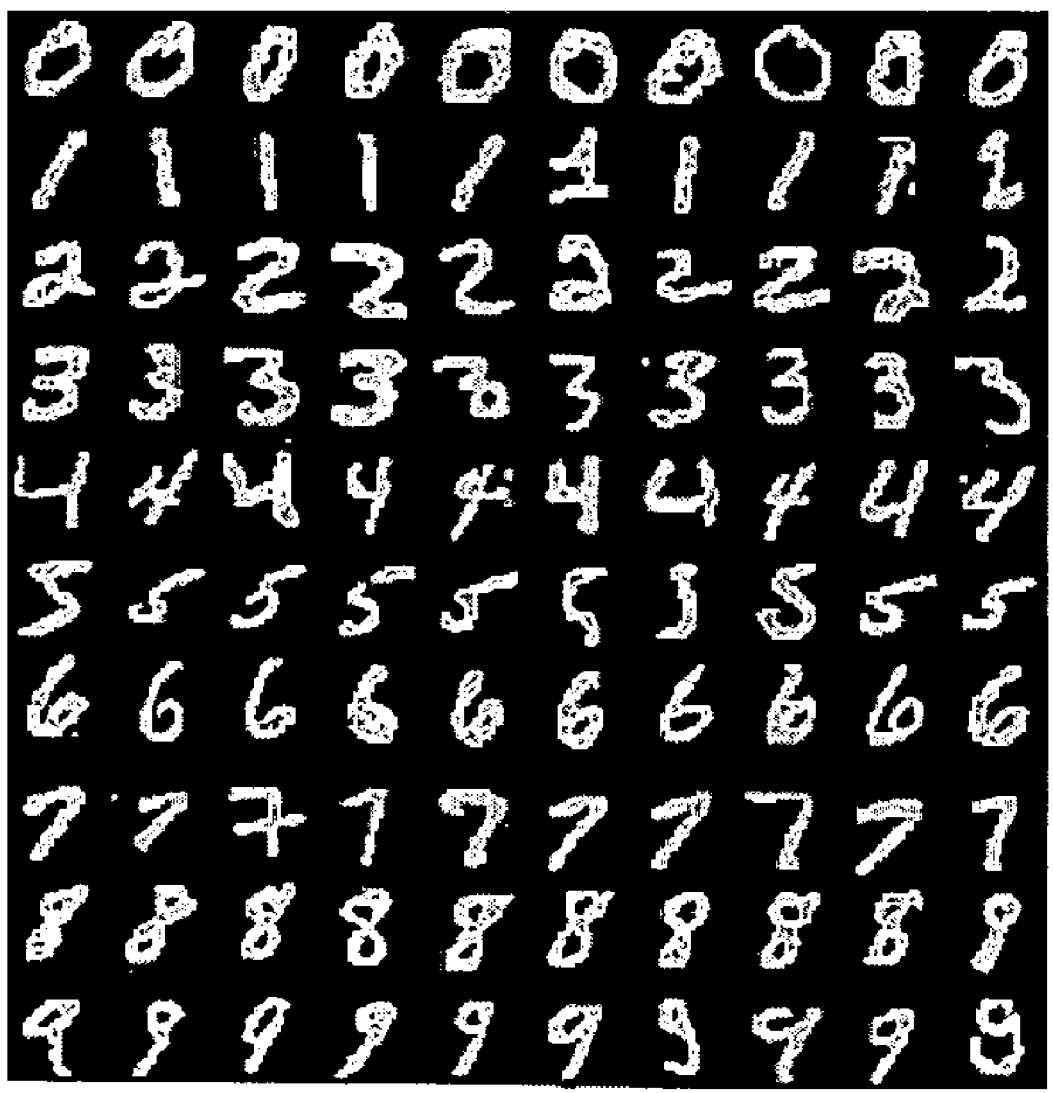
FIG. 11 shows exemplary training data of handwritten digits.

We have conducted experiments on the MNIST database of the handwritten digits available from http://yann.lecun.com/exdb/mnist/. The data set has 10 classes, from "0" to "9". The MNIST database was collected among the Census Bureau employees and high school students with 60000 training samples and 10000 testing samples. The size of images in this data base is 28×28 pixels. FIG. 11 shows some examples.

The MILN network adopted has three layers. The first layer has 20×20=400 neurons and its k is set to 40. The second layer has 10×10=100 neurons with k=10. The third layer has 10 neurons. In the training stage, the signal of the third output layer was imposed by the given class information. In the testing state, the neuron of the third layer with the largest output gives the recognized class identification. After sparse coding, the output of the network is a vector of length 10 in the form of (0, 1, 0, . . . , 0) which means that the sample is clustered to digit "1"

Figure 12:
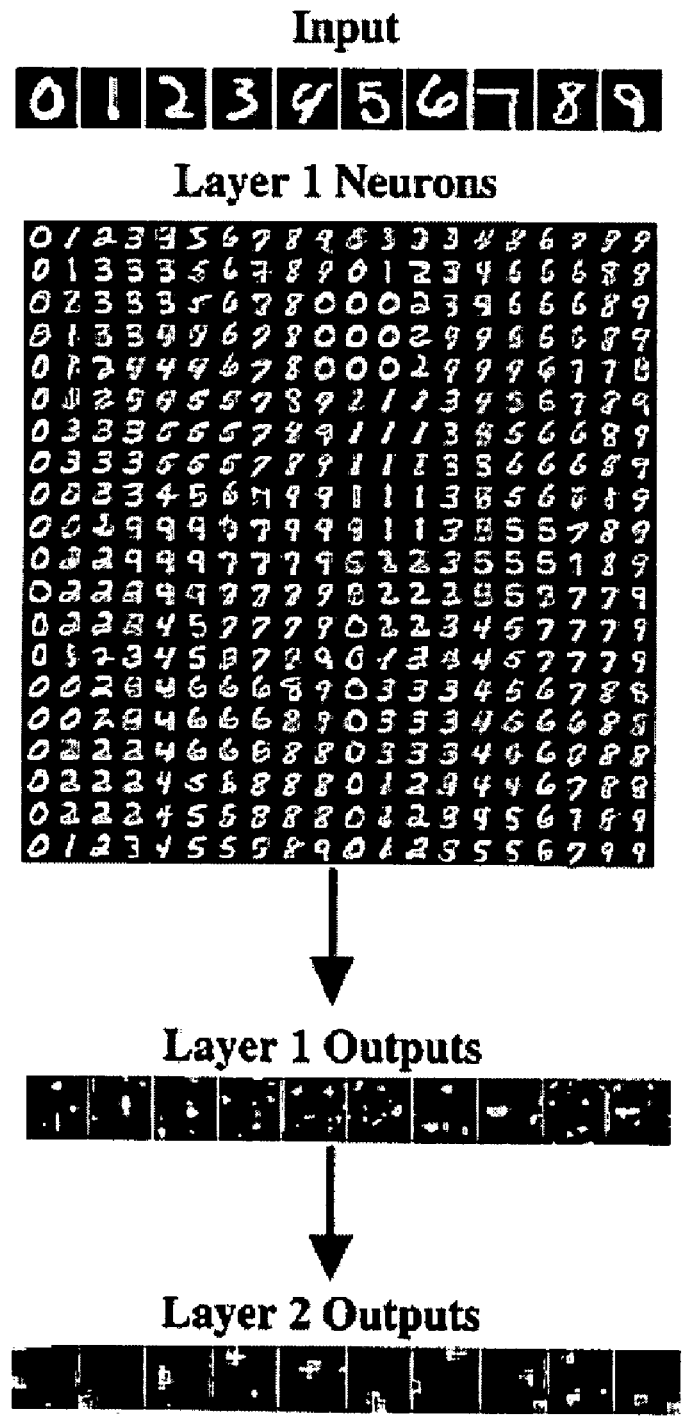
FIG. 12 illustrates neurons at different layers developed using the handwritten training data.

Correspondingly, FIG. 12 shows neurons of each level developed using the training set. The figure demonstrates that the features at the first layers are smooth across the 2-D surface S, but it is not guaranteed that features of the same class are clustered in a single connected area. This is due to several reasons. First, the initialization determines their initial assignments. Although later supervision can alter their features, such an alternation is limited within a limited period of development. Second, this experiment shows something very important for development in natural world: the effect of limited environment. If the environment only shows a restricted set of patterns (e.g., vertical or horizontal edges, numerals, etc.), neurons developed in the earlier layers are significantly biased toward such limited environments. Third, the active neurons are sparsely distributed, which means the neurons representing different digits tend to be far from each other in the neuron array.

It is worth noting that a fixed pattern matching without local attention selection (i.e., without flexible recognition base on appearance of parts) is not able to achieve a high recognition rate for such a diverse set of numerals. Although an increase in the number of samples helps to increase the recognition rate, a practical recognizer that can recognize a wide variety of objects must develop local quasi-invariant features. The work presented here is largely theoretical and architectural. The experimental results serve for visualization of the effects on a limit type of stimuli (numerals), which allows more intuitive understanding of the mechanisms.

If the input is natural images, we expect that small receptive fields will be developed in early layers (i.e., most weights are nearly zero), enabling development of quasi-invariant local features in early layers and invariant recognition based on quasi-invariant parts detected in early layers. However, this hypothesis needs to be verified by future experimental studies.

In-place learning algorithm described above may be implement using software running on applicable microprocessor. The software may be coded in any suitable programming language and may be embodied in any of a range of computer-readable media including, but not limited to, floppy disks, hard disks, CDs, zip disks, and DVD disks. It is to be understood that only the relevant steps of the algorithm are discussed above, but that other software-implemented instructions may be needed to control and manage the overall operation of the system. Alternatively, the learning algorithms may be implemented in hardware. The above description is merely exemplary in nature and is not intended to limit the present disclosure, application, or uses.

What is claimed is:

1. A multi-layer in-place learning developmental network, comprising: an input layer having a plurality of artificial neurons; multiple intermediate layers having a plurality of artificial neurons, each intermediate layer having artificial neurons that receive an input vector signal from neurons in previous layers; an input vector signal from neurons in the same layer and an input vector signal from neurons in subsequent layers; and an output layer having a plurality of artificial neurons, where the neurons in the network implement an in-place learning algorithm that estimates a feature vector of a given neuron by an amnesic average of input vectors weighted by corresponding response of the given neuron, where amnesic is a recursive, incremental computation of the input vector weighted by the response, such that a direction of the feature vector and a variance of signals in the region projected to the feature vector are both recursively estimated with a plasticity scheduling.

2. The in-place learning network of claim 1 wherein neurons in the network implement an in-place learning algorithm that adapts using a lateral inhibition mechanism and Hebbian learning.

3. The in-place learning network of claim 1 wherein neurons in the network are initialized upon creation using input from a preceding layer of the network.

4. The in-place learning network of claim 2 wherein the in-place learning algorithm computes a response for all neurons in a given layer of the network using a current input sample; selects one or more neurons in the given layer having the largest response; and updates the selected neurons using temporally scheduled plasticity.

5. The in-place learning network of claim 4 wherein the in-place learning algorithm computes a response in accordance with $$z_i = \frac{y(t) \cdot v_i^{(t-1)}}{\|v_i^{(t-1)}\|}$$

where y(t) is an input vector and $v_i$ is a feature vector for a given neuron.

6. The in-place learning network of claim 5 wherein the response goes through a sigmoidal function g of the neuron.

7. The in-place learning network of claim 1 wherein each artificial neuron in the output layer outputs a control signal to a motor.

8. The in-place learning network of claim 1 wherein each artificial neuron in the output layer correspond to a different class of a classifier, such that the neuron having largest output corresponds to class that has been classified by the network.

9. The in-place learning network of claim 1 wherein neurons in the network receive input signals from other decision areas of a system to which the network is part of.

10. An in-place learning algorithm for a multi-layer network, comprising:
    defining a sample space as a plurality of cells fully connected to a common input;
    dividing the sample space into mutually non-overlapping regions, where each region is represented by a neuron having a single feature vector; and
    estimating a feature vector of a given neuron by an amnesic average of an input vector weighted by the response of the given neuron, where amnesic is a recursive computation of the input vector weighted by the response such that a direction of the feature vector and a variance of signals in the region projected onto the feature vector are both recursively estimated with plasticity scheduling.

11. The learning algorithm of claim 10 further comprises dividing the sample space into regions having a high concentration of a probability density of the input.

12. The learning algorithm of claim 10 wherein estimating a feature vector employs a lateral inhibition mechanism.

13. The learning algorithm of claim 10 wherein estimating a feature vector is based on Hebbian learning.

14. The learning algorithm of claim 10 wherein the sample space forms a layer in the multi-layer network and the input vector includes output from previous layers.

15. The learning algorithm of claim 10 wherein the sample space forms a layer in the multi-layer network and the input vector includes output from subsequent layers.

16. The learning algorithm of claim 10 further comprises supervising a given region using attention selection signals from other regions.

17. An in-place learning algorithm for a multi-layer network having a plurality of neurons organized into multiple layers, comprising: computing a response for all neurons in a given layer of the network using a current input sample; selecting one or more neurons in the given layer having the largest response; updating the selected neurons using temporally scheduled plasticity, wherein computing a response further comprises estimating a feature vector of a given neuron by an amnesic average of an input vector weighted by corresponding response of the given neuron, where amnesic is a recursive computation of the input vector weighted by the response such that a direction of the feature vector and a variance of signals in the region projected onto the feature vector are both recursively estimated with plasticity scheduling.

18. The learning method of claim 17 further comprises initializing neurons in a given layer using input from preceding layers of the network prior to the step of computing a response.

19. The learning method of claim 17 further comprises retaining age and weight for all unselected neurons in the given layer.

20. The learning method of claim 17 further comprises repeating each step for each subsequent input sample.

21. The learning method of claim 17 further comprises performing each step for each layer of the network.

22. The learning method of claim 17 selecting one or more neurons employs a lateral inhibition mechanism.

23. The learning method of claim 17 selecting one or more neurons further comprises sorting responses for all neurons in a given layer, selecting neurons having largest n responses and setting responses remaining neurons to zero.

24. The learning method of claim 17 wherein updating the selected neurons is based on Hebbian learning.

25. The learning method of claim 17 further comprises updating the selected neurons in accordance with $$v_j^{(t)} = w_1 v_j^{(t-1)} + w_2 z_j y(t),$$

where the scheduled plasticity is determined by its two age-dependent weights:

$$w_1 = \frac{n(j) - 1 - \mu(n(j))}{n(j)}, \quad w_2 \frac{1 + \mu(n(j))}{n(j)},$$

with $w_1 + w_2 \equiv 1$ and $\mu$ is plasticity schedule.

26. The learning method of claim 17 wherein updating the selected neurons further comprises incrementing age of selected neuron by one.

27. The learning method of claim 17 wherein updating the selected neurons further comprises updating neurons adjacent to the selected neurons.

28. The learning method of claim 17 wherein neurons in the given layer receive input signals from preceding layers, from the same layer, and from subsequent layers.

* * * * *

UNITED STATES PATENT AND TRADEMARK OFFICE
CERTIFICATE OF CORRECTION

| | |
|---|---|
| PATENT NO. | : 7,711,663 B2 |
| APPLICATION NO. | : 11/728711 |
| DATED | : May 4, 2010 |
| INVENTOR(S) | : Juyang Weng |

It is certified that error appears in the above-identified patent and that said Letters Patent is hereby corrected as shown below:

Title Page, No. (57), Abstract, line 5, after "is", delete "a".

Column 1, line 51, "form" should be --from--.

Column 3, line 65, "though" should be --through--.

Column 3, line 67, after "space", insert --;--.

Column 4, line 7, "illustrates" should be --illustrate--.

Column 4, line 7, "set" should be --sets--.

Column 4, line 52, "is shown" should be --shown in--.

Column 6, line 36, after "space", delete "contains,".

Column 6, line 39, after "on", delete "a".

Column 7, line 43, "that" should be --than--.

Column 10, line 7, "(x(n))" should be -- 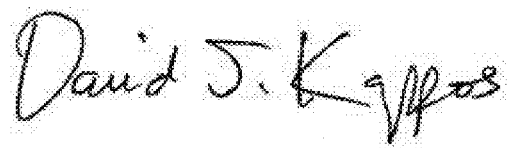 --.

Column 10, line 37, "Eq. 11" should be --Eq. (11)--.

Column 11, line 20, "+n(j)" should be --n(j)--.

Column 12, line 36, after "inhibit itself", insert --.--.

Column 12, line 45, "be" should be --by--.

Column 13, line 45, "in logically" should be --is logically--.

Column 14, line 14, "trends" should be --tends--.

Signed and Sealed this
Eighth Day of March, 2011

David J. Kappos
*Director of the United States Patent and Trademark Office*

Column 14, line 20, after "y>", insert --?--.

Column 14, line 44, after " "1" ", insert --.--.

Column 15, lines 13-14, "implement" should be --implemented--.

Column 16, line 7, Claim 8, "correspond" should be --corresponds--.